(12) United States Patent
Blosch

(10) Patent No.: US 6,428,118 B1
(45) Date of Patent: *Aug. 6, 2002

(54) ARRANGEMENT AND METHODS FOR AVOIDING ROLLOVERS WHEN BRAKING OR ACCELERATING MOTOR VEHICLES

(75) Inventor: Georg Blosch, Murr (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/408,025

(22) Filed: Sep. 29, 1999

(30) Foreign Application Priority Data

Sep. 29, 1998 (DE) ........................ 198 44 540

(51) Int. Cl.[7] .............................. B60T 13/00
(52) U.S. Cl. .................... 303/9.64; 303/142; 303/182; 303/186
(58) Field of Search .................. 188/181 A, 181 C; 303/142, 140, 186, 192, 113.2, 182, 9.69, 9.64, 137, 191, 194, 193, 198, 124.1

(56) References Cited

U.S. PATENT DOCUMENTS

| | | | | |
|---|---|---|---|---|
| 3,604,273 A | * | 9/1971 | Kwok | 73/505 |
| 3,899,028 A | * | 8/1975 | Morris | 172/4.5 |
| 4,930,082 A | * | 5/1990 | Harara | 364/424.05 |
| 4,976,330 A | * | 12/1990 | Matsumoto | 180/197 |
| 5,239,868 A | * | 8/1993 | Takenaka | 73/505 |
| 5,247,466 A | * | 9/1993 | Shimada | 364/566 |
| 5,324,102 A | * | 6/1994 | Roll | 303/100 |
| 5,816,670 A | * | 10/1998 | Yamada | 303/194 |
| 6,065,558 A | * | 5/2000 | Wielenga | 180/282 |

FOREIGN PATENT DOCUMENTS

JP          62055211       *  3/1987

OTHER PUBLICATIONS

Mizuno et al. "High Frequency Operation Of Metal–Halide Lamp Controlled By Microcomputer" Journal of Illuminating Engineering Of Japan, vol. 71, No. 10 pp. 622–625 (Oct. 1987).

* cited by examiner

Primary Examiner—J. J. Swann
Assistant Examiner—Christopher Bottorff
(74) Attorney, Agent, or Firm—Kenyon & Kenyon

(57) ABSTRACT

An arrangement for avoiding rollovers when accelerating motor vehicles, single-track or double-track vehicles such as motorcycles or passenger cars in particular, with an arrangement for comparing a difference in rotational speed between the speed of at least one front wheel or the front axle and the speed of at least one rear wheel or the rear axle of the motor vehicle with an adjustable rotational speed difference threshold value. Also included is an arrangement for detecting a wheel acceleration for at least one front wheel and for at least one rear wheel and an arrangement for activating the vehicle's propulsion system when the rotational speed difference threshold value is reached or exceeded if the wheel acceleration is simultaneously negative for at least one front wheel and positive for at least one rear wheel.

15 Claims, 4 Drawing Sheets

ARRANGEMENT AND METHODS FOR AVOIDING ROLLOVERS WHEN BRAKING OR ACCELERATING MOTOR VEHICLES

FIELD OF THE INVENTION

The present invention relates to arrangements and methods for avoiding rollovers when braking or accelerating motor vehicles, single-track or double-track vehicles such as motorcycles or passenger cars in particular.

BACKGROUND INFORMATION

In order to avoid or reduce the possibility of rollovers during braking or acceleration, conventional vehicles have design features such as a long wheelbase, a low center of gravity, a balanced axle load distribution or low braking or propulsive power. More recently, however, vehicles having a short wheelbase and a significantly higher center of gravity have become increasingly popular. In such vehicles, there is the danger that a rollover or tipping over on or about the front axle will take place, especially on downhill grades. There is also the danger that a vehicle with rear wheel drive will tip backwards about the rear axle when strongly accelerating or when reaching uphill grades, for example. Such difficulties also occur, for example, in motorcycles or racing cars, drag racing cars in particular. In motorcycles, the avoidance of rollovers during acceleration is entirely dependent on the driving skill of the driver.

A braking force control system for motor vehicles is known from German Published Patent Application No. 21 33 547 in which a sensor is assigned to each wheel for the measurement of the momentary rotational characteristics, the signals of the sensor being processed in an evaluation circuit and compared with specified rotational deceleration, acceleration and/or slip thresholds, the evaluation circuit emitting signals for operation of the inlet and outlet valves assigned to the wheel if the threshold values are exceeded or not met, as a result of which the braking pressure drops, remains constant or increases in order to avoid wheel locking, an additional logical operation being provided in the evaluation circuit in vehicles having a short wheelbase and a high center of gravity which reduces the pressure on the front wheel brakes if a signal indicating road adherence of the rear wheels does not arrive within a specific waiting period. This printed publication deals exclusively with braking force control systems; arrangements for increasing the safety or handling of a vehicle during acceleration are, however, not dealt with. In addition, the disadvantage of such a braking force control system is that it initiates braking force control only after receiving a signal indicating the lack of road adherence. Due to the elasticity of the tires, this can result in delays in initiating braking force control.

An arrangement for the detection of rollovers in vehicles is known from German Published Patent Application No. 196 09 717 in which angular rate sensors measure the angular rate of the vehicle about the yaw axis, the roll axis and the pitch axis, an arrangement being present which signals a rollover event if at least one of the measured angular rate exceeds a specifiable limiting value.

SUMMARY OF THE INVENTION

An object of the present invention is to specify arrangements or methods by which such rollovers can be avoided in an effective manner during braking or acceleration.

According to the arrangement of the present invention, a criterion indicating the danger of a rollover can be specified in a simple manner from the determination of the rotational speed difference of at least one front wheel and at least one rear wheel (or the rotational speed difference between the front and rear axle) with a rotational speed difference threshold value and the determination of a wheel acceleration for at least one front wheel and for at least one rear wheel. When a vehicle with rear wheel drive is accelerated, specifically in the event of an impending backwards rollover about the rear axle, the rotational speed of the rear wheels is increased while the rotational speed of the front wheels is reduced simultaneously. When the rotational speed difference threshold value and corresponding acceleration values are reached, control of the vehicle's propulsion system is triggered (in particular via an anti-spin regulation (ASR)) to reduce the propulsive power, as a result of which an impending backwards rollover can be effectively avoided. A suitable rotational speed difference threshold value can, for example, be determined on the basis of vehicle tests or also by model calculations which are at least based on vehicle geometry. Advantageously, the threshold value describes a state in which no immediate danger of a rollover exists.

According to another arrangement of the present invention, sensors or switches, limit switches, for example, are attached to the vehicle's front axle. The position of the front axle in relation to the road surface or in relation to the rear axle can be determined in a simple manner via such limit switches so that in this case also the engine control unit can be activated or propulsive power can be reduced, via an ASR system in particular. In principle, two types of limit switches can be used. The first type of limit switch is a discrete limit switch which simply differentiates whether or not the limit position has been reached. As long as the limit position has not been reached, such limit switches do not generate a signal. Only if the limit position is reached is a signal emitted. In addition, limit switches which emit a continuous-value signal can be provided. Such a continuous-value signal can be analyzed as a measure of the position of the sprung mass (vehicle body) in relation to the unsprung mass (wheel, axle components) or of spring travel at a particular moment. The use of such limit switches makes it possible to detect a braking rollover or even an acceleration rollover solely via a limit switch assigned to an axle of the vehicle. In fact, with a limit switch of this type, it is possible to detect the direction of movement of the sprung mass or the magnitude of the rebound rates, i.e., the changes of the spring travels. If a single limit switch is used, the dynamic characteristics of the vehicle must also be taken into account. The use of level sensors, such as those used in connection with headlight leveling control, is also possible as an alternative to limit switches.

According to another arrangement of the present invention, at least one angular rate sensor is provided to detect a rotation of the vehicle about its rear axis. When angular rate sensors are used to detect an impending rollover, the rotational speed about the corresponding vehicle axle is compared with an associated threshold value. Moreover, the rotational speed is integrated over time and thus the angle of rotation about the corresponding vehicle axis is determined. This angle of rotation is also compared with an associated threshold value. If the rotational speed or the angle of rotation are greater than the associated threshold values, the danger of rollover is recognized.

Advantageously, the characterizing features of the devices specified according to the present invention can be combined in any manner. This makes it possible to achieve increased reliability or safety in the avoidance of motor vehicle rollovers during acceleration.

According to another arrangement of the present invention, rollovers during braking can be avoided easily and reliably. During braking, the state of the vehicle at the start of a rollover is characterized by very strong braking action and by the fact that the vehicle begins to tip forwards about the front axle. As a result, the rotational speed of the rear wheels which, for example, can be acted upon by an ABS/ASR system, drops to zero due to the abrupt loss of the frictional connection. Owing to the elasticity of the tires, however, this loss of frictional connection does not take place at the same time as the actual start of the rollover motion. However, the switches or sensors detecting the movement or the limit position of the unsprung axle components make it possible to initiate a reduction of the braking action appropriate to the situation already with partial or total rebound, i.e., already before the rear wheels lose frictional connection. In particular, ABS/ASR systems can be used for such reduction. Rollovers during acceleration can be avoided in an analogous manner, since the direction of movement of the unsprung components in relation to the sprung components detected by the switches or sensors is merely the opposite.

According to an advantageous embodiment of the arrangement according to the present invention, at least one active speed sensor is provided which is mechanically linked to at least one rear wheel or the rear axle of the vehicle. This makes it possible to detect reliably a loss of frictional connection of the rear wheels which are in particular affected by an ABS or ASR system, via which an effective criterion for the activation of an ABS or ASR system is made available. Such ABS systems can, for example, reduce the braking pressure or braking force in the front wheel brakes until the rear wheels turn again or a control time limiting value is exceeded, thus ensuring that the vehicle, due to its inertia, is no longer in the process of rolling over but rather comes to a complete standstill. This also ensures that the vehicle does not continue to "creep" forward, which would extend the braking distance in a disadvantageous manner. Particularly in combination with the method of the present invention of attaching sensors or switches to determine the limit position of at least one unsprung axle component, the result is a safe and reliable system to avoid motor vehicle rollovers, resulting in a significant increase of vehicle safety.

Advantageously, the arrangement of the present invention for avoiding rollovers during braking has an angular rate sensor and an arrangement to activate the braking control system in the event a predetermined angular rate is reached or exceeded (i.e., at least reached).

The arrangements of the present invention to avoid rollovers during braking can be used with all braking systems, including braking systems operated with non-liquid or non-gaseous transmission media.

It proves to be particularly advantageous that angular rate sensors attached to the rear axle can be used both for the detection of impending rollovers during braking as well as during acceleration.

The arrangements of the present invention for the prevention of rollovers can, as mentioned, be used advantageously in combination with ABS and ASR systems. A corresponding expansion of such ABS or ASR systems can be easily implemented.

DETAILED DESCRIPTION

Figure 1:
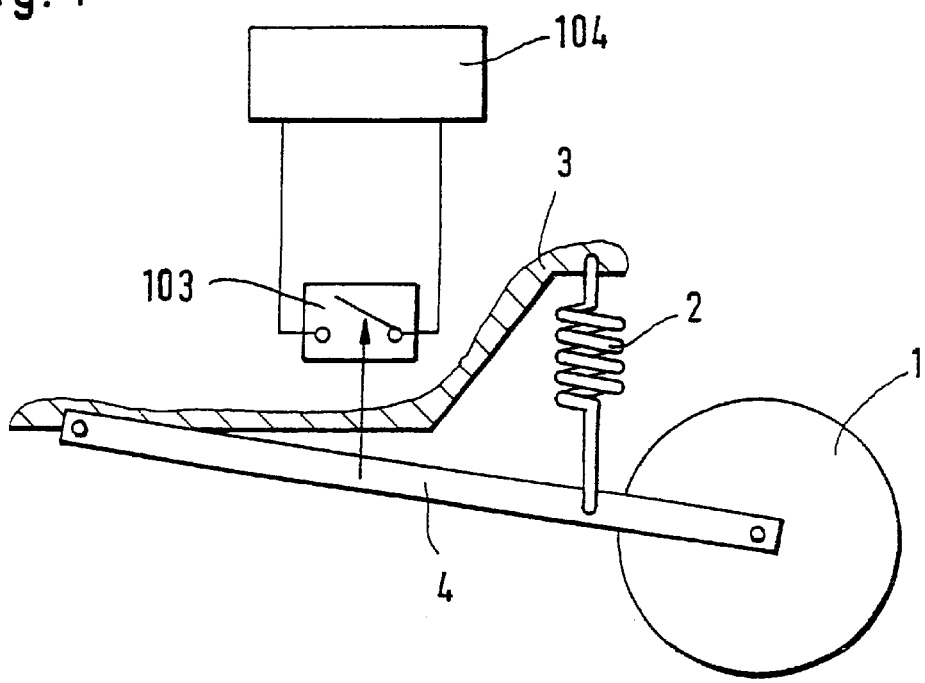
FIG. 1 shows a diagrammatic representation of the use of limit switches to detect an impending rollover of a vehicle.

In FIG. 1, a wheel 1 is coupled to a sprung mass, the vehicle body 3 in particular, via an axle component 4 and a spring suspension 2. Corresponding to its movement in relation to vehicle body 3, axle component 4 acts upon a limit switch 103. Limit switch 103 is connected via conductor leads to a control unit 104.

For the following explanation of the drawing, it is assumed that wheel 1 is a front wheel of a motor vehicle and accordingly axle component 4 is an axle component of the front axle of the vehicle. Moreover, it is assumed that the vehicle (not shown) has rear wheel drive. It should be noted that these assumptions are made solely for reasons of clarity of the representation and are applicable by analogy to a front wheel drive.

If the motor vehicle is accelerated too strongly, the front axle area (in the case of rear wheel drive) tends to lift off the road surface. As a result (upward movement of the sprung mass or vehicle body 3), limit switch 103 is brought into its closed position so that a corresponding signal is sent to control unit 104. In the event of a lifting off or backwards rollover of the vehicle, which is indicated by the position of the limit switch, control unit 104 is now capable of initiating suitable control measures. Accordingly, a backwards rollover about the rear axle of the motor vehicle can be appropriately detected and prevented via limit switches arranged in the rear axle area.

Figure 2:
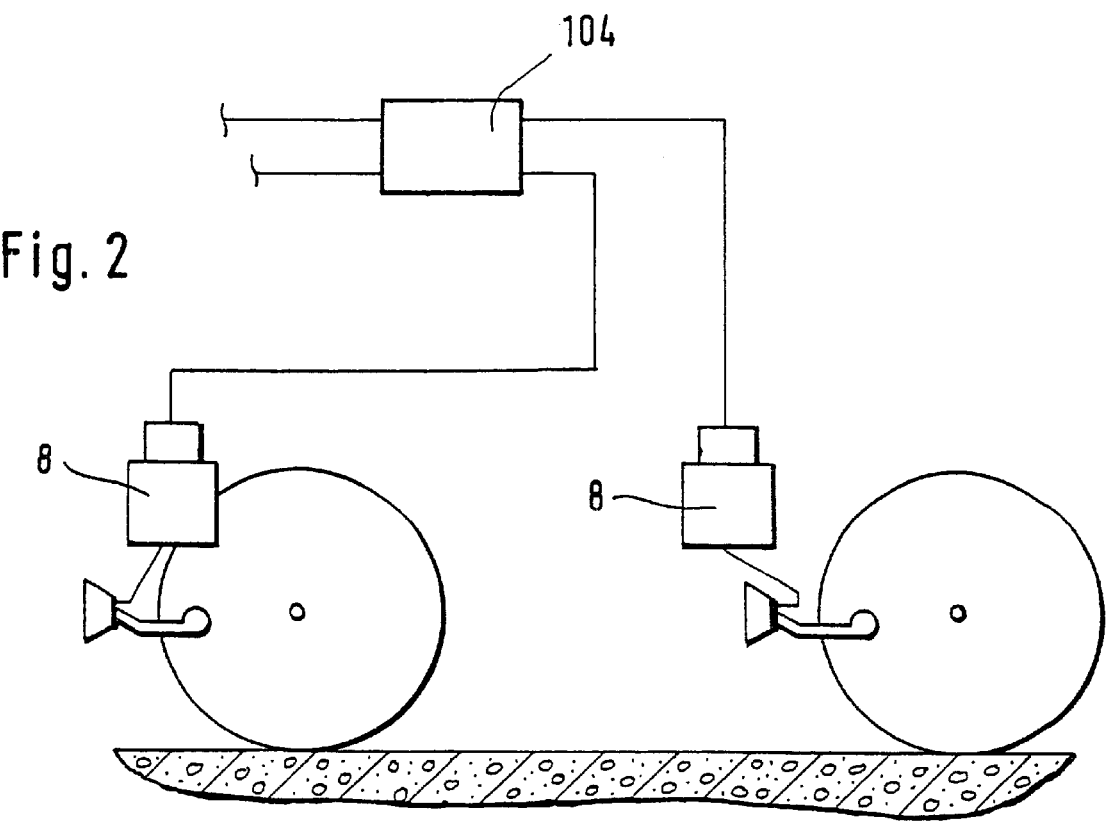
FIG. 2 shows a diagrammatic representation of the use of level sensors to detect an impending rollover of a vehicle.

Level sensors for determining the position of a vehicle body in relation to a road surface are schematically identified as 8 in FIG. 2. Such level sensors are used, for example, in headlight leveling control systems. Level sensors 8 are connected to a control unit 104 which can initiate suitable control measures in the event of an impending rollover of the motor vehicle indicated by the level sensor.

Figure 3:
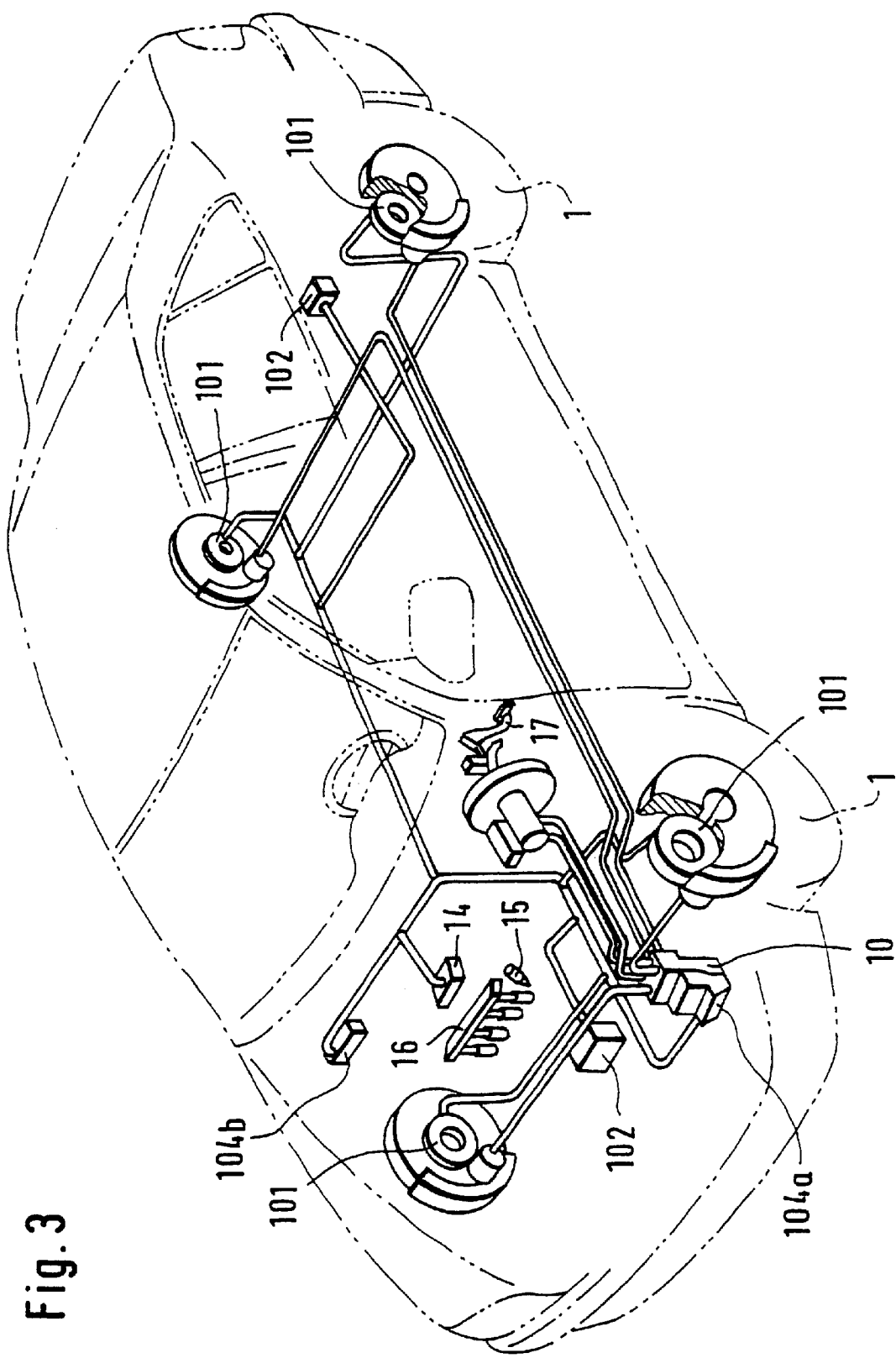
FIG. 3 shows a diagrammatic perspective view of a motor vehicle equipped with an ABS/ASR system and angular rate sensors according to the present invention.

The control units of FIGS. 1 and 2 are, for example, control units of an ABS/ASR system, as is schematically shown in FIG. 3, or control units interacting with an ABS/ASR control unit.

In the system shown in FIG. 3, each wheel of the motor vehicle is provided with a (schematically shown) rotational speed sensor 101. For the proper control of the braking pressure applied to each wheel 1, the measured values of the wheel speed sensors 101 can be supplied to a control unit 104a of a hydraulic unit 10. In addition, the motor vehicle is provided with (schematically shown) angular rate sensors 102 which detect a tipping behavior of the vehicle (rotation about the front or rear axle) in particular. The measured values determined by sensors 102 can be supplied to control unit 104a mounted on hydraulic unit 10 and an additional engine management control unit 104b. In the event of an impending forwards or backwards rollover of the vehicle under excessive acceleration or sudden braking (represented by the signals of angular rate sensors 102), the interaction of the named control units brings about a modulation of the braking force of wheels 1 and/or an engine management by influencing, for example, a throttle actuator 14, fuel injectors 15 or an ignition module 16. The signal of an accelerator pedal sensor 17 may be sent to the control units as an additional sensor variable. A rollover of the motor vehicle under acceleration is avoided by comparing the rotational speeds of at least one front wheel 1 detected by wheel speed sensors 101 and of at least one rear wheel 1 with an adjustable rotational speed difference threshold value. Moreover, the differentiation by time of the measured values of wheel speed sensors 101 brings about a determination of the wheel acceleration of at least one front wheel and of at least one rear wheel. If it is now determined that when the rotational speed difference threshold value is reached or exceeded (i.e., at least reached), the wheel acceleration is simultaneously negative for at least one front wheel and positive for at least one rear wheel, hydraulic unit 10 or the engine management system is activated for the generation and implementation of appropriate correction signals or corrections.

The tilt rates or angular rates determined by angular rate sensors 102 may be provided additionally or alternatively to the named limit switches 103 or level sensors 8 in order to determine whether a rollover is impending. An appropriate combined analysis of the respective sensor signals, for example, makes a redundant system available for the monitoring of a rollover, which increases the safety and reliability. It is also possible to detect an impending tipping state of the motor vehicle exclusively on the basis of the signals generated by wheel speed sensors 101. For this purpose, it is determined whether the wheel speed on the front or rear axle suddenly drops as a result of which a loss of frictional connection of the wheels with the road can be represented. An impending rollover can be concluded from such a loss of frictional connection.

Based on FIGS. 4 and 5, the options made available according to the present invention to avoid rollovers during braking or acceleration for motor vehicles will now be explained in a more general form.

Figure 4:
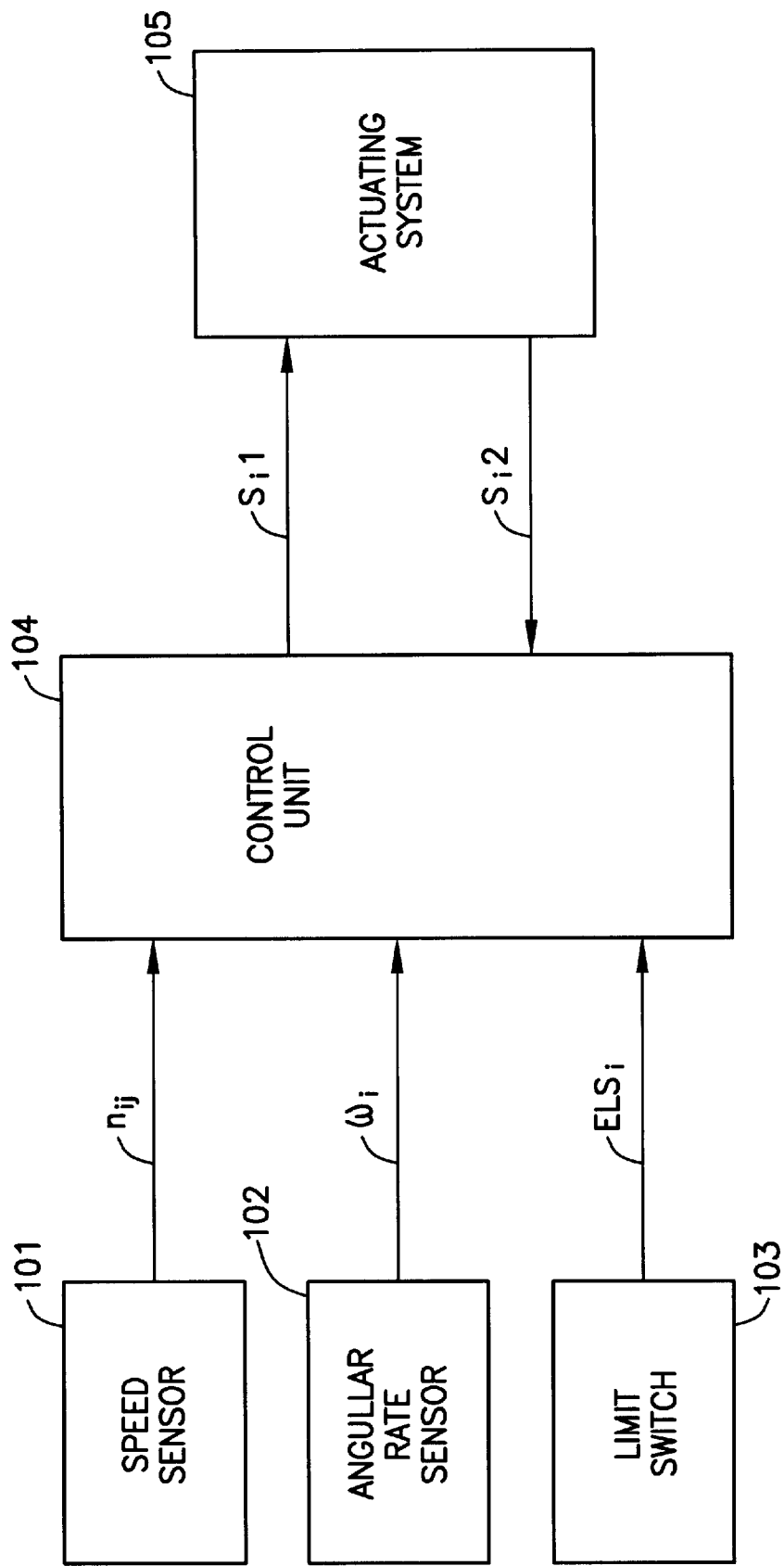
FIG. 4 shows a block diagram for the basic representation of the arrangements according to the present invention.
Figure 5:
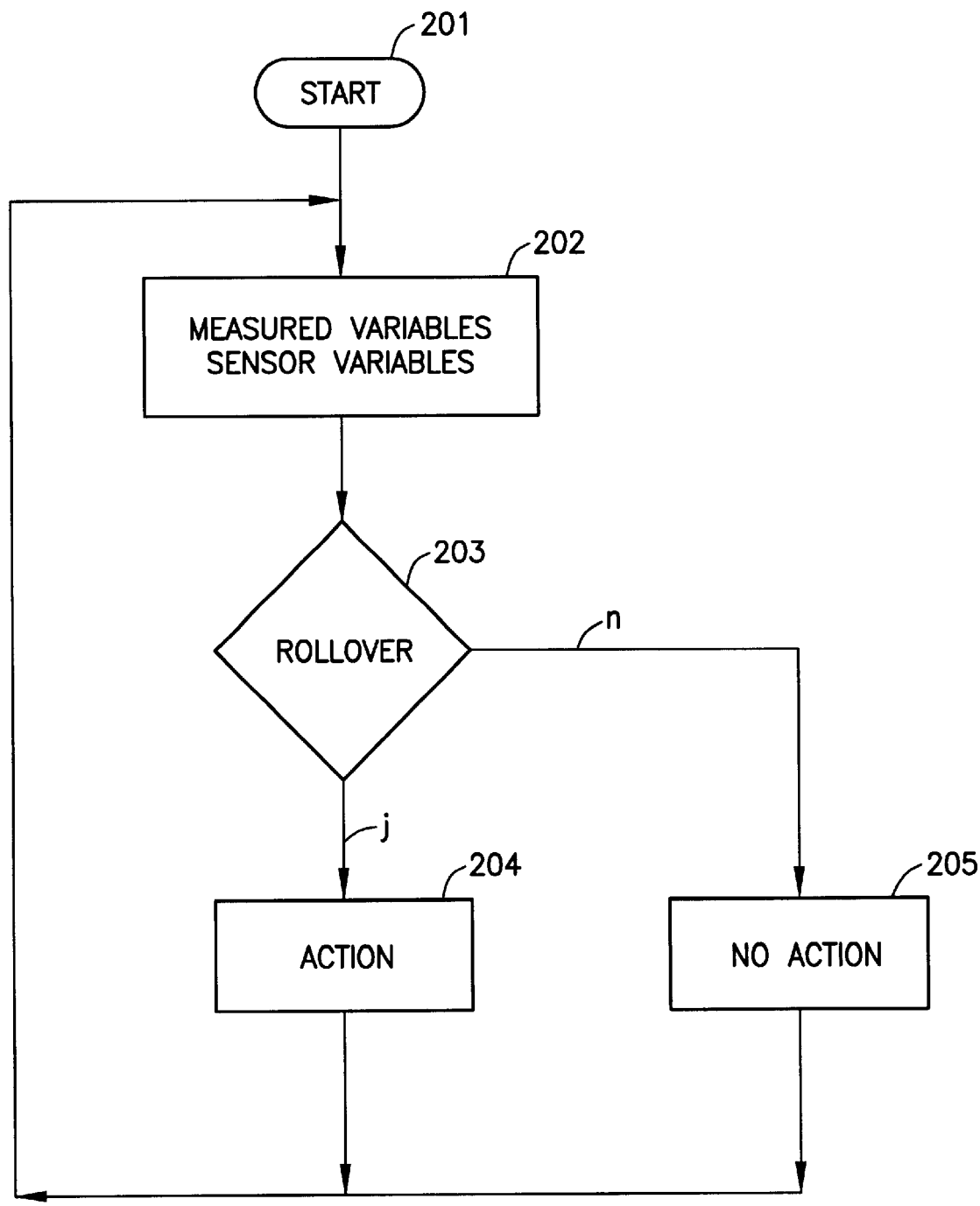
FIG. 5 shows a flow chart illustrating the mode of functioning of the arrangements according to FIG. 4 or the methods according to the present invention.

In FIG. 4, wheel speed sensors which supply rotational speeds $n_{ij}$ as signals are identified as 101. The index i identifies front (v) or rear (h) and the index j identifies left (l) or right (r). It would also be conceivable to consider one wheel speed sensor per vehicle axis. An angular rate sensor is identified as 102 The angular rate determined with this angular rate sensor is identified as $\omega_1$, the index i representing front or rear axle. A limit switch is identified as 103. The signal detected by a particular limit switch is identified as $ELS_i$, the index i again representing front or rear axle. It is conceivable to assign several limit switches to one axle, for example, one limit switch 103 per wheel.

Signals $n_{ij}$, $\omega_i$, and $ELS_i$ are sent to a control unit 104 which emits signals or variables $S_i1$ to control an actuating system 105 (e.g., ABS/ASR or engine management system). For this purpose, control unit 104 forms the timing difference of the detected rotational speed $d/dt\ (n_{ij})$ to detect an acceleration of the motor vehicle. Control unit 104 receives signals or variables $S_i2$ as feedback from actuating system 105.

In the case of acceleration with an impending rollover (impending rollover about the rear axle of the vehicle with rear wheel drive, for example), the throttle actuator or ignition point is influenced via actuating system 105, resulting in a reduction of engine torque. In the braking case, i.e., in the case of an impending rollover about the front axle in particular, the valves assigned to the wheel brake cylinders are influenced, resulting in a reduction of braking pressure.

As an alternative or as a supportive measure, level sensors may be used in addition to limit switches 103. If level sensors are used, a value recorded by the level sensor during the application is detected which characterizes the rollover danger of the vehicle (the situation in this case corresponds, for example, to the situation in which limit switches 103 have either reached their particular limit stop or are about to do so). This value can be used as a threshold value in the monitoring system according to the present invention.

The sequence of monitoring impending rollovers will now be explained in detail with the aid of FIG. 5.

The start of the process is identified as 201. Measured variables and sensor variables are supplied in a step 202.

For example, values $n_{ij}$ and $d/dt\ (n_{ij})$ are supplied in step 202 for the analysis of wheel speed difference and wheel acceleration in the case of an impending acceleration rollover. The values $ELS_i$ are supplied for the analysis of limit switches in the case of an acceleration rollover or braking rollover monitoring. Correspondingly, level sensor signals are supplied for the analysis of level sensors. If angular rate sensors are used to monitor an acceleration rollover or a braking rollover, $\omega_i$ or the cited integral of $\omega_i$ over time is supplied in step 202. Finally, appropriate wheel speed values can be supplied in the case of analysis of wheel speeds to determine a loss of frictional connection for the situation of a braking rollover or an acceleration rollover.

In the subsequent step 203, a check is made of whether a rollover is impending or not. The check conditions listed below can be combined in any desired sequence for an impending acceleration rollover or braking rollover.

If a wheel speed difference between at least one front wheel and at least one rear wheel is detected which is greater than a threshold value and there are corresponding wheel acceleration (negative wheel acceleration of the front wheels and positive wheel acceleration of the rear wheels), an appropriate action is taken in step 204. If the named threshold value is not reached and/or the corresponding wheel accelerations are not reached, there is a branching to step 205 with no action being taken.

A corresponding branching to step 204 takes place if, for example, a limit switch with signal values 0.1 outputs the value $ELS_i=1$. If continuous-value limit switches are used, an action according to step 204 is taken in the event that $ELS_i$ is greater than a threshold value. A corresponding control takes place for measured values obtained from level sensors.

When angular rate sensors are used, action according to step 204 is taken if the detected angular rate $\omega_i$ about the front or rear axle and an integral of $\omega_i$ over time are greater than a threshold value; otherwise, consistent with step 205, no action is taken.

If only the wheel speeds of the front or rear axle are analyzed (in the case of monitoring a rollover over the front axle or the rear axle of the vehicle to recognize frictional connection of the wheels), step 204 is activated if a corresponding threshold value is exceeded; otherwise step 205 is activated.

What is claimed is:

1. An arrangement for avoiding a rollover when accelerating a motor vehicle corresponding to one of a single-track vehicle such as a motorcycle or a double track vehicle such as a passenger car, comprising:

an arrangement for comparing a difference in rotational speed between a speed of one of at least one front wheel on a front axle or a speed of one of at least one rear wheel on a rear axle of the motor vehicle with an adjustable rotational speed difference threshold value;

an arrangement for detecting a wheel acceleration for the at least one front wheel and for the at least one rear wheel; and an arrangement for activating a propulsion control system of the motor vehicle when the rotational speed difference threshold value is at least reached if the wheel acceleration is simultaneously negative for the at least one front wheel and positive for the at least one rear wheel.

2. The arrangement according to claim 1, further comprising:

an arrangement including one of a plurality of sensors or a plurality of switches and being attached to the front axle of the motor vehicle to determine one of a position or a limit position of the front axle of the motor vehicle; and an arrangement for activating the propulsion control system of the motor vehicle if one of the position or the limit position of the front axle of the motor vehicle corresponding to an impending rollover is detected.

3. The arrangement according to claim 1, further comprising:

at least one angular rate sensor for detecting a rotation of the motor vehicle about the rear axle; and an arrangement for activating the propulsion control system of the motor vehicle if a predetermined angular rate is at least reached.

4. An arrangement for avoiding a rollover when braking a motor vehicle corresponding to one of a single-track vehicle such as a motorcycle or a double-track vehicle such as a passenger car, comprising:

an arrangement including one of a plurality of sensors or a plurality of switches, the arrangement being capable of being attached to one of a rear axle or a rear axle area of the motor vehicle in order to determine one of a position or a limit position of at least one unsprung axle component; and an arrangement for activating a braking control system if one of the position or the limit position of the at least one unsprung axle component corresponding to an impending rollover of the motor vehicle is detected.

5. The arrangement according to claim 4, wherein the braking control system corresponds to an ABS system.

6. The arrangement according to claim 4, further comprising:

at least one speed sensor mechanically linked to one of at least one rear wheel attached to the rear axle or the rear axle; and an arrangement for activating the braking control system if a loss of a frictional connection of the at least one rear wheel with a road surface occurs.

7. The arrangement according to claim 4, further comprising:

an angular rate sensor for detecting a rotational movement of the motor vehicle about a front axle thereof; and an arrangement for activating the braking control system if one of a predetermined angular rate or a tip rate is at least reached.

8. A method for avoiding a rollover when accelerating a motor vehicle corresponding to one of a single-track vehicle such as a motorcycle or a double-track vehicle such as a passenger car, comprising the steps of:

comparing a rotational speed difference between a speed of one of at least one front wheel on a front axle of the motor vehicle or a speed of one of at least one rear wheel on a rear axle of the motor vehicle with an adjustable rotational speed difference threshold value;

determining a wheel acceleration for the at least one front wheel or for the at least one rear wheel; and activating a propulsion control system of the motor vehicle if the rotational speed difference threshold value is at least reached and if the wheel acceleration is simultaneously negative for the at least one front wheel and positive for the at least one rear wheel.

9. A method for avoiding a rollover when accelerating a motor vehicle corresponding to one of a single-track vehicle such as a motor cycle or a double-track vehicle such as a passenger car, comprising the steps of:

detecting one of a position or a limit position of a front axle of the motor vehicle via one of a plurality of sensors or a plurality of switches attached to the front axle of the motor vehicle; and activating a propulsion control system of the motor vehicle when one of the position or the limit position of the front axle of the motor vehicle corresponding to an impending rollover is detected.

10. The method according to claim 9, wherein:

the plurality of sensors include level sensors, and the plurality of switches include limit switches.

11. A method for avoiding a rollover when accelerating a motor vehicle corresponding to one of a single-track vehicle such as a motorcycle and a double-track vehicle such as a passenger car, comprising the steps of:

detecting an angular rate of the motor vehicle about a rear axle thereof via an angular rate sensor;

determining an angle of rotation by integrating the angular rate over time;

comparing the angle of rotation with an associated threshold value; and activating a propulsion control system of the motor vehicle if a predetermined angular rate is at least reached and if the angle of rotation is greater than the associated threshold value.

12. A method for avoiding a rollover when braking a motor vehicle corresponding to one of a single-track vehicle such as a motorcycle or a double-track vehicle such as a passenger car, comprising the steps of:

detecting one of a position and a limit position of at least one unsprung axle component via a plurality of sensors capable of being attached to one of a rear axle or a rear axle area of the motor vehicle; and activating a braking control system if one of the position or the limit position of the at least one unsprung axle component corresponding to an impending rollover of the motor vehicle is detected.

13. The method according to claim 12, wherein the braking control system includes an ABS system.

14. The method according to claim 12, further comprising the step of:

detecting a speed of at least one rear wheel attached to the rear axle via a rotational speed sensor mechanically linked to one of the at least one rear wheel or the rear axle of the motor vehicle, wherein the braking control system is activated if a loss of a frictional connection of the at least one rear wheel with a road surface is detected.

15. The method according to claim 12, further comprising the step of:

determining a rotational movement of the motor vehicle about a front axle thereof via an angular rate sensor, wherein the braking control system of the motor vehicle is activated if one of a predetermined angular rate or a tip rate is at least reached.

* * * * *